(12) United States Patent
Britton et al.

(10) Patent No.: US 9,361,597 B2
(45) Date of Patent: Jun. 7, 2016

(54) VARIABLE RISK ENGINE

(75) Inventors: David Britton, Phoenix, AZ (US); Ori Eisen, Scottsdale, AZ (US); Raz Yalov, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 492 days.

(21) Appl. No.: 13/276,908

(22) Filed: Oct. 19, 2011

(65) Prior Publication Data

US 2012/0096557 A1    Apr. 19, 2012

Related U.S. Application Data

(60) Provisional application No. 61/394,686, filed on Oct. 19, 2010.

(51) Int. Cl.
*G06F 11/00* (2006.01)
*G06F 12/14* (2006.01)
*G06F 12/16* (2006.01)
*G08B 23/00* (2006.01)
*G06Q 10/06* (2012.01)
*G06Q 20/40* (2012.01)

(52) U.S. Cl.
CPC ............ *G06Q 10/0635* (2013.01); *G06Q 20/40* (2013.01); *G06Q 20/4016* (2013.01); *H04M 2203/6027* (2013.01)

(58) Field of Classification Search
CPC .............. G06Q 20/4016; G06Q 20/40; H04M 2203/6027
USPC ......... 713/166; 726/26; 705/64–76, 317–318; 235/380–383
See application file for complete search history.

(56) References Cited

U.S. PATENT DOCUMENTS

| | | | |
|---|---|---|---|
| 6,163,604 A | 12/2000 | Baulier et al. | |
| 6,295,605 B1 | 9/2001 | Dockter et al. | |
| 7,373,669 B2 | 5/2008 | Eisen | |
| 7,447,494 B2 | 11/2008 | Law et al. | |
| 7,457,823 B2 | 11/2008 | Shraim et al. | |
| 7,543,740 B2 | 6/2009 | Greene et al. | |
| 7,665,658 B2 | 2/2010 | Fields | |
| 7,673,793 B2 | 3/2010 | Greene et al. | |
| 7,685,629 B1 * | 3/2010 | White et al. | 726/2 |
| 7,708,200 B2 | 5/2010 | Helsper et al. | |

(Continued)

FOREIGN PATENT DOCUMENTS

JP    2008-535124 A    8/2008

OTHER PUBLICATIONS

International search report and written opinion dated Apr. 18, 2012 for PCT/US2011/056948.

*Primary Examiner* — Daniel Potratz
(74) *Attorney, Agent, or Firm* — Knobbe, Martens, Olson & Bear, LLP

(57) ABSTRACT

The invention provides systems and methods for risk assessment using a variable risk engine. A method for risk assessment may comprise setting an amount of real-time risk analysis for an online transaction, performing the amount of real-time risk analysis based on the set amount, and performing an amount of time-delayed risk analysis. In some embodiments, the amount of real-time risk analysis may depend on a predetermined period of time for completion of the real-time risk analysis. In other embodiments, the amount of real-time risk analysis may depend on selected tests to be completed during the real-time risk analysis.

20 Claims, 10 Drawing Sheets

(56) References Cited

U.S. PATENT DOCUMENTS

| | | |
|---|---|---|
| 7,958,029 B1 | 6/2011 | Bobich et al. |
| 8,567,669 B2 | 10/2013 | Griegel et al. |
| 2001/0011243 A1 | 8/2001 | Dembo et al. |
| 2003/0163413 A1* | 8/2003 | Wiczkowski ......... G06Q 20/00 705/38 |
| 2005/0097320 A1* | 5/2005 | Golan et al. ................ 713/166 |
| 2005/0216278 A1 | 9/2005 | Eisen |
| 2007/0101405 A1 | 5/2007 | Engle et al. |
| 2007/0124246 A1 | 5/2007 | Lawyer et al. |
| 2007/0233599 A1 | 10/2007 | Ganesan et al. |
| 2007/0234409 A1 | 10/2007 | Eisen |
| 2007/0239606 A1 | 10/2007 | Eisen |
| 2008/0021801 A1* | 1/2008 | Song et al. ...................... 705/35 |
| 2008/0162202 A1* | 7/2008 | Khanna ................ G06Q 20/10 705/14.47 |
| 2008/0222706 A1 | 9/2008 | Renaud et al. |
| 2009/0083184 A1 | 3/2009 | Eisen |
| 2009/0222308 A1 | 9/2009 | Zoldi et al. |
| 2009/0292568 A1 | 11/2009 | Khosravani et al. |
| 2010/0004965 A1 | 1/2010 | Eisen |
| 2010/0005013 A1* | 1/2010 | Uriarte ................ G06Q 20/40 705/30 |
| 2013/0024300 A1 | 1/2013 | Choudhuri et al. |
| 2013/0197998 A1 | 8/2013 | Buhrmann et al. |

* cited by examiner

VARIABLE RISK ENGINE

CROSS-REFERENCE

This application claims the benefit of U.S. Provisional Application No. 61/394,686, filed Oct. 19, 2010, which application is incorporated herein by reference in its entirety.

BACKGROUND OF THE INVENTION

In parallel to the growth in use of online channels for accessing a variety of services, and performing a variety of transactions, identity theft has reached epidemic levels, and online account takeover and transaction fraud is growing at an enormous rate. Recent scams indeed show a sophisticated, determined, innovative and well organized online crime wave. Fraudsters are more adaptive than ever, modifying their modus operandi and techniques quickly to exploit new vulnerabilities. While the fraudsters do not limit themselves to a specific sector, their main focus is on the banking and financial accounts sectors (other sectors prone to fraud are government services, ISPs, telecom companies and healthcare and many others).

One issue is authentication—how does a service or transaction provider indeed know whether a certain user accessing a service and performing actions at a certain site is indeed who he or she claims to be. Most risk engines are devised into two or more categories, and their response time determines their categorization. Namely, real-time and time-delayed (sometimes called batch processing, day later or after-the-fact) risk engines. However, depending on the type of session or transaction, it may be desirable to perform an initial risk assessment within a desired amount of time, while also reassessing risk on an ongoing or continual basis, so that at any point in the life-cycle of an event, when a business process requires a risk assessment from the risk engine, such a response is available. This may include a risk assessment of an event that has occurred at some point in the past, where emerging events or data may influence the risk engine to modify the original set of risk decisions pertaining to that event.

Thus, a need exists for a risk engine that may accommodate different types of sessions or transactions, and perform a desired amount of risk assessment across points of time and with diverse influencers.

SUMMARY OF THE INVENTION

An aspect of the invention may be directed to methods for risk assessment comprising: setting an amount of real-time risk analysis for an online transaction; performing the amount of real-time risk analysis based on the set amount; and performing an amount of time-delayed risk analysis. In some embodiments, the amount of real-time risk analysis may occur within a predetermined length of time, or within the time dictated by the timing factors present at the moment of the session or event. In some embodiments, a transaction event may occur after the real-time risk analysis is completed.

A system for risk assessment may be provided in accordance with another aspect of the invention. The system may comprise an institution server; and a network device in communication with the institution server. The institution server may be configured to perform a risk analysis of the communication with the network device, and the institution server may accept an amount of real-time risk analysis for an online transaction with the network device; may perform the amount of real-time risk analysis based on the set amount; and may perform an amount of time-delayed risk analysis.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for risk assessment using a variable risk engine. Various aspects of the invention described herein may be applied to any of the particular applications set forth below or for any other types of authentication, fraud detection or risk management. The invention may be applied as a standalone system or method, or as part of a service, tool, or an integrated software package. It shall be understood that different aspects of the invention can be appreciated individually, collectively, or in combination with each other.

The invention provides systems and methods that provide risk assessment for a user device that may connect with or communicate with an institution. The invention may be applicable to network security and the detection of fraudulent transactions or identity theft. For example, the risk assessment systems and methods may be used to detect fraud being carried out by one or more user devices and user accounts over a communications network, or even detecting and preventing potential fraud or identity theft by individuals trying to complete a transaction remotely by phone or mail, or even in person. It will be appreciated, however, that the systems and methods in accordance with the invention can have greater utility; for example, the invention may also be applicable to any system where a user or user device identification may be relevant. The systems and methods can be used for any form of risk assessment associated with a transaction or session between the user device and the institution.

Figure 1A:
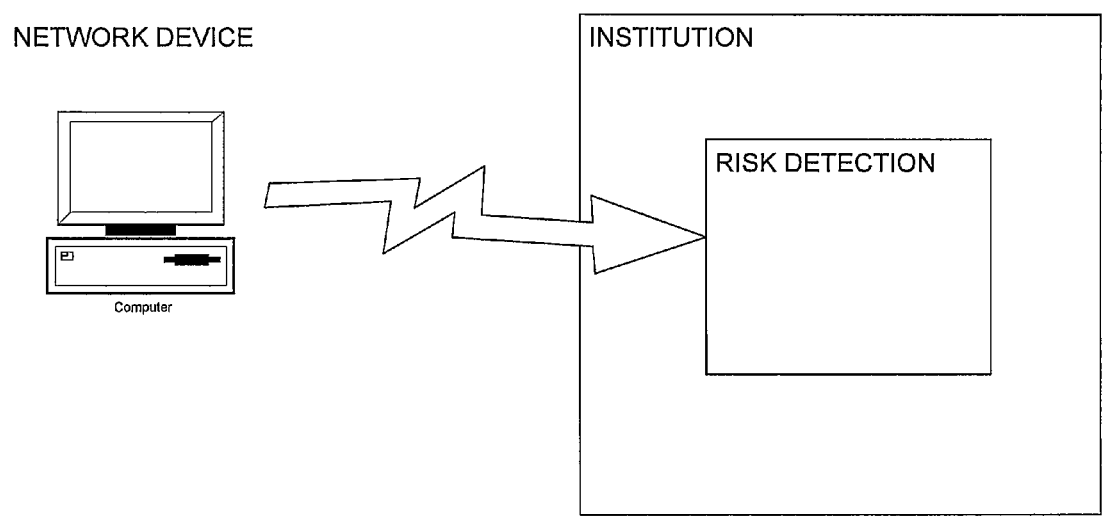
FIG. 1A shows an example of a network device communicating with an institution which may perform risk detection.

FIG. 1A shows an example of a network device communicating with an institution which may perform risk detection in accordance with an embodiment of the invention. The one or more network devices may include user computers whether they be a personal computer, server computer, or laptop computer; tablet; personal digital assistants (PDAs) such as a Palm-based device or Windows CE device; phones such as cellular phones, smartphones (e.g., iPhone, BlackBerry, Android, Treo); a wireless device such as a wireless email device or other device capable of communicating wirelessly with a computer network or other communication network; or any other type of network device that may communicate over a network and handle electronic transactions.

The institution that may communicate with one or more network devices may be any sort of host, such as an online organization, an electronic commerce business, an online merchant, a financial institution, or any other type of website service provider that may provide a service to a user or may interact with a user's network device. The network device may be in communication with an institution server, computer, or any other device. Although an institution server is illustrated and described, any device may be used for the institution server. An institution and a network device may perform an electronic transaction, such as a purchase of a product or service, such as online banking. An institution and a network device may have a session with one another while they are in communication. In accordance with one aspect of the invention, each electronic transaction or session may be susceptible to fraud or other form of risk and the risk can be assessed.

The communication between a network device and an institution may be, for example, a connection between a client computer and a website server over a network. One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. The communication may occur over a telephone network, through the mail, or even in person. Each network device may connect to any institution over the network using data protocols, such as HTTP, HTTPS and the like.

When a network device is communicating with the institution, the device may have a processor and a memory that may store an operating system (OS) and a browser application. For example, the operating system may operate to display a graphical user interface to the user and permit the user to execute other computer programs, such as the browser application. The browser application, such as Microsoft Internet Explorer, Mozilla Firefox, when executed by the processor, permits the user to access the World Wide Web as is well known. The network device may interact with an institution, which may perform some form of risk assessment.

A user may access the network device. In some embodiments, the device user may interact with an interface of the network device. The device user may use the network device to communicate or access an institution server. In some embodiments, the device user may access the institution through an institution website that may be accessed by the browser of the network device. In some embodiments, a device user may have a user account associated with the institution.

In some embodiments, an institution may have one or more web-based server computers, such as a web server, an application server, a database server, etc., that are capable of communicating with a network device over a network, such as the Internet or a wireless network, and are capable of downloading web pages to the network device. In some implementations, the institution may comprise one or more processors, one or more persistent storage devices and a memory. For the institution to interact with the network devices, the memory may store (and the processor(s) may execute) a server operating system and a transaction processing software system to facilitate an electronic transaction or session between the institution and one or more network devices. Each institution may further comprise a database, such as a database server or a data structure stored in the memory of the institution, which may store the electronic transaction data for the institution. In some embodiments, a server for an institution may have greater computing or processing power than a network device. Similarly, the server may have more memory than a network device.

The institution may control each device and/or each user's access to the resources of the institution by, for example, denying access to a user or device in particular circumstances. In some embodiments, the institution may require a device or user to be authenticated before accessing the resources of the institution. For example, if a network device has been implicated in fraud, an institution may prevent a transaction with the network device from occurring. In another example, if a user has a 'bad' or 'low' rating, an institution may prevent the user from participating in an electronic sales forum. The institution may perform a risk assessment of the network device, user, or relating to the transaction or session.

In some embodiments, the risk assessment may occur by a risk detection module of the institution. In some embodiments, the risk detection module may be owned or operated by the institution. The risk detection module may reside on a memory, such as the memory of an institution server. The institution memory may include tangible computer readable media which may contain instructions, logic, data, or code that may be stored in persistent or temporary memory of the institution server, or may somehow affect or initiate action by an institution server. In some embodiments, an institution may use a variable risk engine to perform a risk assessment, which may be described further below.

In some embodiments, the memory and processing used for risk assessment may be provided by the institution. The memory and processing for risk assessment may be provided by one or more institution server and/or database. Such risk assessment may be performed for one or more network devices that may communicate with the institution. In some embodiments, the risk assessment may be performed for all network devices communicating with the institution. In some embodiments, the same risk assessment may be performed for all of the network devices communication with the institution. In other embodiments, the risk assessment may vary for different network devices communicating with the institution. In some embodiments, the risk assessment may vary depending on network device type, information provided by the user, transaction type, or session type.

Figure 1B:
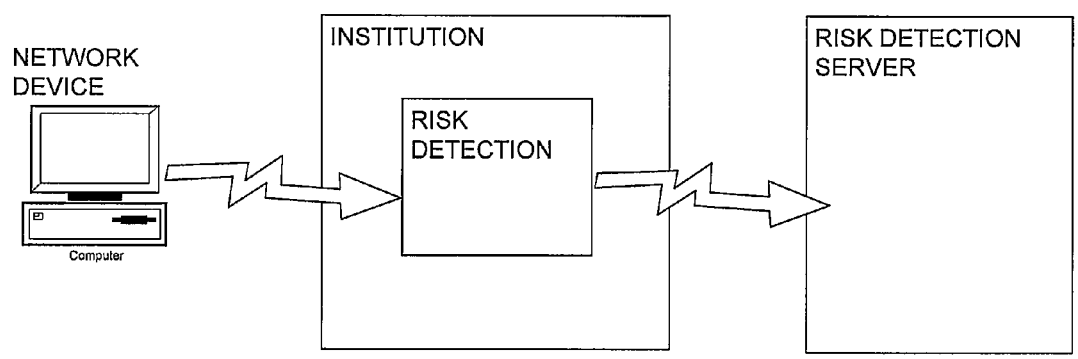
FIG. 1B shows an example of a network device communicating with an institution which may communicate with a risk detection server when performing risk detection.

FIG. 1B shows an example of a network device communicating with an institution which may communicate with a risk detection server when performing risk detection. In some embodiments, a risk assessment may be made when a network device communicates with an institution. The risk assessment may assess risk relating to the network device, user of the network device, transaction and/or session. In some embodiments, one or more parts of the risk assessment may be performed by a risk detection server.

An institution server may communicate with a risk detection server. In some embodiments, the communication between an institution and risk detection server may be, for example, a connection between an institution website server and another server over a network. One or more web servers may communicate with one or more risk detection server across a network. The network, for example, can include a private network, such as a LAN, or interconnections to the online organizations over a communications network, such as the Internet or World Wide Web or any other network that is capable of communicating digital data, such as a wireless or cellular network. The communication may occur over a telephone network, through the mail, or even in person.

In some embodiments, the risk detection server may be different from an institution server that primarily communicates with one or more network device. An institution server may communicate with a risk detection server to perform a risk assessment when a network device communicates with the institution server. In some embodiments, the risk detection server may be owned or operated by the institution, or may be owned or operated by an independent third party. The risk detection server may include non-transitory computer readable media which may contain instructions, logic, data, or code that may be stored in persistent or temporary memory of the institution server, or may somehow affect or initiate action by risk detection server. In some embodiments, a risk detection server may use a variable risk engine to perform a risk assessment, which may be described further below.

In some embodiments, the risk assessment may be performed entirely by the risk detection server, which may be accessed through the institution. In other embodiments, the risk assessment may be performed entirely by the institution. In other embodiments, some risk assessment may be performed by the institution and some may be performed by the risk detection server.

In some embodiments, a risk detection server may communicate with one or more institution. For example, one, two, three, four, or more institutions may use the risk detection server to perform a risk assessment. The institutions may or may not be independent of one another. In some embodiments, the one or more institutions may share information with one another to assist with performing the risk assessment. The institutions may share this information with one another directly, or may share this information through the risk detection service. In some embodiments, the risk detection server may store information that may be shared between one or more institution, and that may assist with risk assessment. Such information may include network device information, user information, account information, transaction information, or session information. Such information may be collected during a transaction or session with the network device. In some embodiments, the risk detection server may store information and perform the risk assessment without the institutions having access to some or all of the information.

In some embodiments, risk assessment may occur using a risk engine. The risk engine may be hosted by an institution and/or risk detection service. The risk engine may be a multi-stage risk engine, where one or more tests performed by the risk engine may be divided into two or more stages. In some embodiments, one or more tests may be performed by the risk engine in a first stage, and one or more tests may be performed by the risk engine in a second stage. In other embodiments, one or more stages need not perform tests. For example, zero tests may be performed in the first stage or zero tests may be performed in the second stage.

Figure 1C:
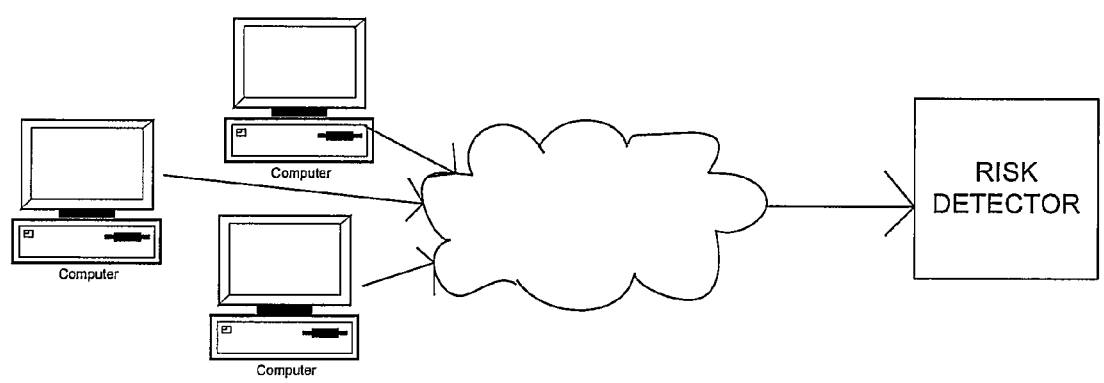
FIG. 1C shows an example of a plurality of network devices communicating with a risk detector over a network.

FIG. 1C shows an example of a plurality of network devices communicating with a risk detector over a network. The plurality of network devices may be computers or any other type of network device described elsewhere herein. The network devices may all be the same type of network device, or may be different types of network devices. The network device may all communicate over the same network (e.g., the Internet) or may communicate over different networks or types of networks.

One or more, or each of the network devices may be involved in an online transaction. A risk assessment may be performed for each of the online transactions. A risk assessment may be performed for each of the network devices involved in an online transaction. The risk assessment may be performed by a risk detector.

The risk detector may be hosted by an institution and/or a risk detection service. For example, the risk detector may operate on an institution server and/or a risk detection service server. One or more processor may be used to implement the risk assessment steps. The risk detector may reside on a memory, such as the memory of an institution server and/or risk detection service server. The memory may include tangible computer readable media which may contain instructions, logic, data, or code that may be stored in persistent or temporary memory of a server, or may somehow affect or initiate action by a server.

Figure 2A:
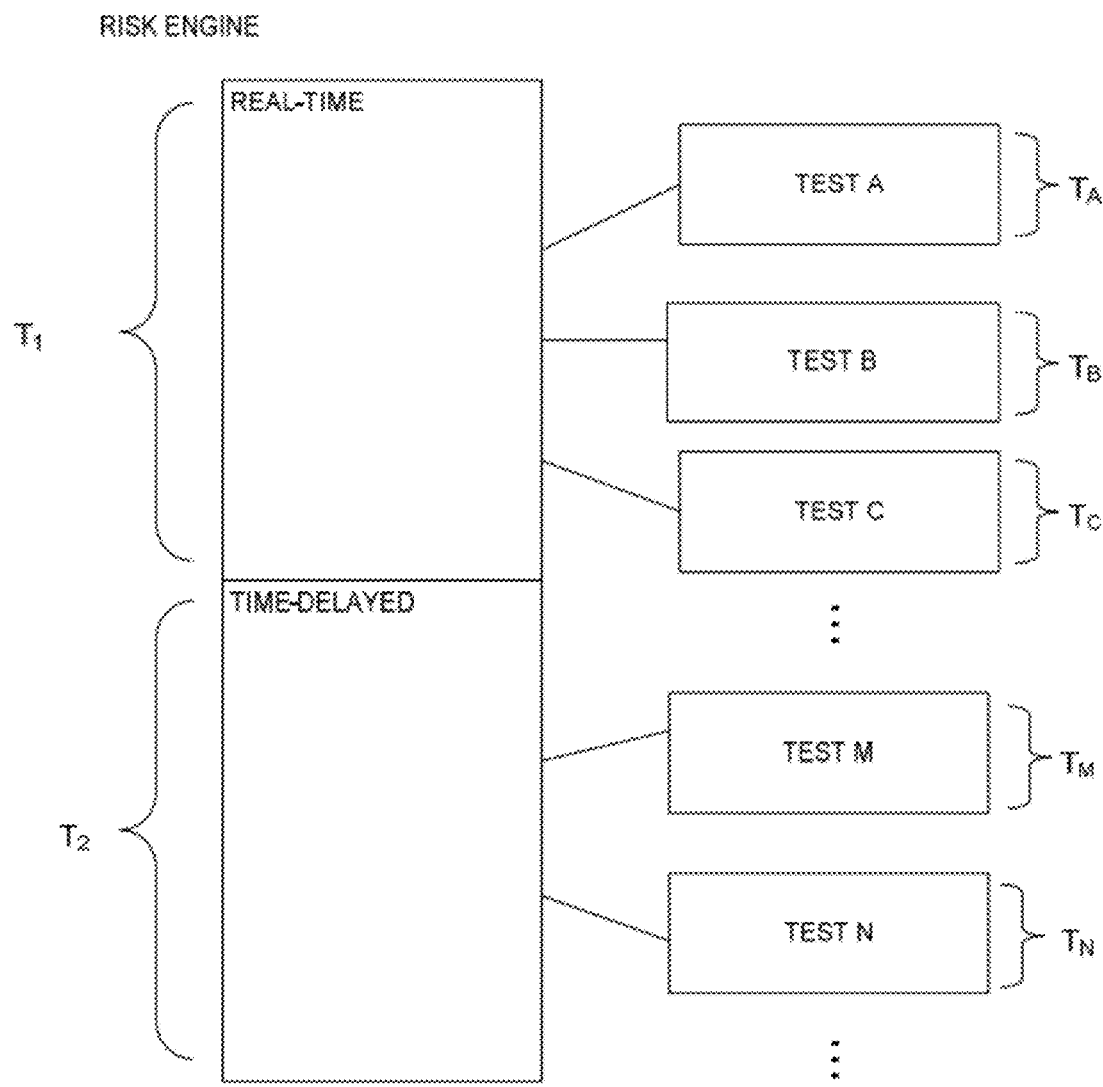
FIG. 2A shows an example of how tests for a risk engine may be divided.

FIG. 2A shows an example of how tests for a risk engine may be divided. A risk engine may be neither just real-time nor time-delayed and both at the same time. In some embodiments, a risk engine may perform some amount of real-time risk assessment and some amount of time-delayed risk assessment.

In some embodiments, the "real-time" risk assessment may occur while a transaction or session is occurring between a network device and an institution server. A "time-delayed" risk assessment may occur after a transaction or session has occurred between a network device and an institution server.

In other embodiments, the real-time risk assessment may occur during a first stage of a transaction or session between a network device and a server. The time-delayed risk assessment may occur during a second stage of a transaction or session between a network device and server. In some embodiments, the real-time risk assessment may occur before a preliminary approval that may occur during a transaction or session. The time-delayed risk assessment may occur after the preliminary approval of a transaction or session.

In some embodiments, real-time may denote a risk decision that is made while the user session is still alive, or while a user is waiting for the next message (approve or decline), or prior to any other event. Time-delayed risk assessment may occur after the user session is no longer alive or after the user receives the next message (e.g., approve or decline), or after an event. In some embodiments, the event may be related to the transaction or session, or may be independent of the transaction or session. The event may be related to the passage of time or a particular time of day. The event may be related to an action taken by a device user or may be related to an event that may occur during the transaction or session. The event may relate to a decision that may occur during a transaction or session.

The time-delayed risk assessment may occur after the real-time risk assessment. In some embodiments, the time-delayed risk assessment may start after the end of the real-time risk assessment (e.g., they may occur in sequence), or prior to the end of the real-time risk assessment (e.g., they may occur in parallel) but may finish after the real-time risk assessment is completed. The time-delayed risk assessment may start at the same time or after the real-time risk assessment starts. The time-delayed risk assessment may be completed after, or alternatively before or the same time, the real-time risk assessment is completed. The real-time risk assessment may be the assessment that needs to be completed before an event can occur (e.g., approval or decline of a transaction). The time-delayed risk assessment may not need to be completed before the event can occur. In some embodiments, the real-time risk assessment may need to be completed before the event can occur. In some instances, the time-delayed risk assessment may or may not be completed before the event occurs. A time-delayed risk assessment may start or continue after the event has occurred.

The time-delayed risk assessment may occur immediately after the real-time risk assessment, or may occur after a period of time following the real-time risk assessment. The time-delayed risk assessment may occur immediately after the real-time risk assessment is completed or has begun, or may occur after a period of time following the real-time risk assessment is completed or has begun. In some embodiments, the time-delayed risk assessment may occur after a predetermined period of time following the real-time risk assessment, or following an event after the real-time risk assessment. The time-delayed risk assessment may occur within a discrete period of time, or may be ongoing. In some embodiments, the time-delayed risk assessment may occur within a continuous period of time, or may occur over multiple discrete periods of time. The time-delayed risk assessment may start after the real-time risk assessment starts or may start in conjunction with the real-time risk assessment. The time-delayed risk assessment may start after the real-time risk assessment ends or may start before the real-time risk assessment ends. The time-delayed risk assessment may end after the real-time risk assessment ends. The time-delayed risk assessment may in fact be a simple continuation of the real-time assessment for a given event, which will continue even after the real-time business process has already solicited the risk engine for a primary response.

The amount of real-time assessment and/or time-delayed assessment may vary depending on the transaction, session, or event. The length of time allotted to the real-time assessment and/or time-delayed assessment may vary depending on the transaction, session, or event. One or more tests or processes run during the real-time assessment and/or time-delayed assessment may vary depending on the transaction, session, or event.

Figure 2B:
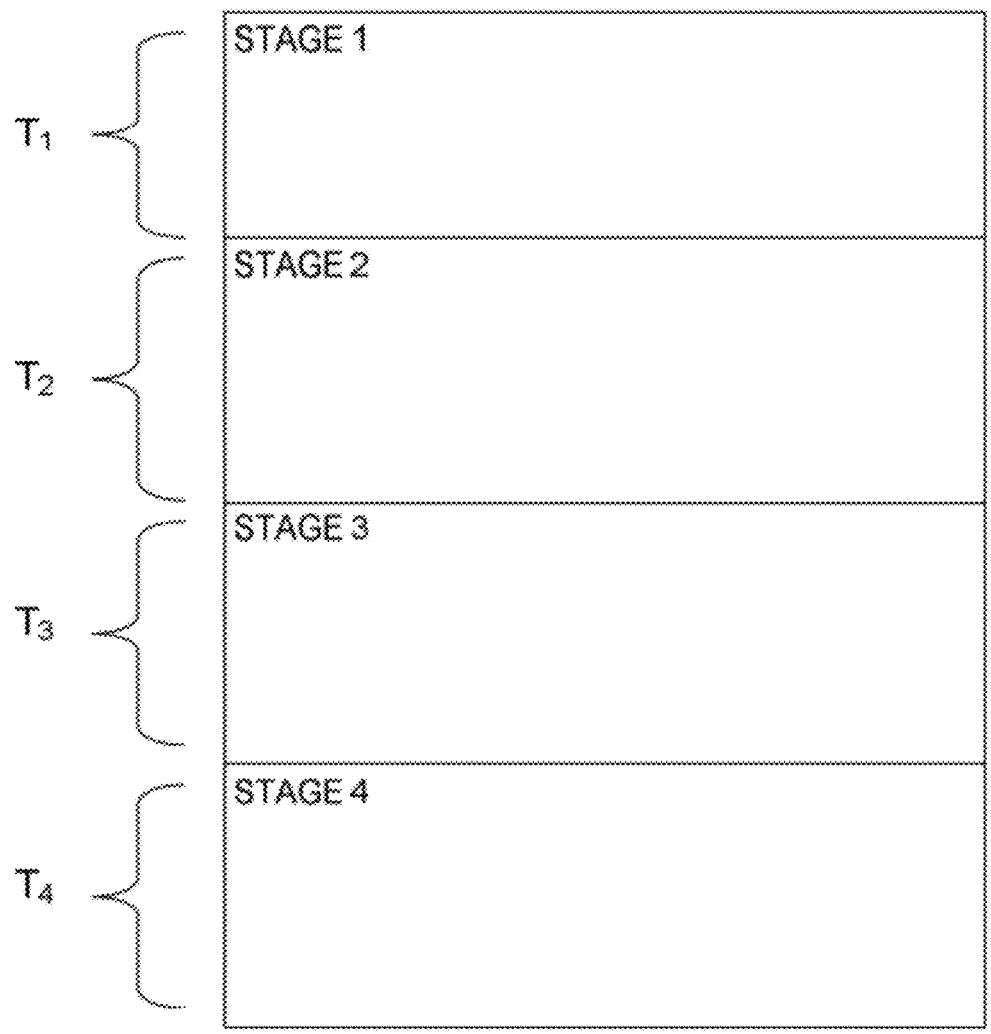
FIG. 2B shows an additional example of a risk engine divided into risk assessment stages.

The risk engine may have one or more stages of risk assessment. FIG. 2B shows an additional example of a risk engine divided into risk assessment stages. For example, the risk engine may have a first stage of risk assessment and a second stage of risk assessment. The first stage of risk assessment may be a real-time risk assessment and a second stage of risk assessment may be a time-delayed risk assessment. In some embodiments, a third stage, fourth stage, or any number of additional stages may be provided. One or more stage may occur during a transaction or session, after a transaction of session is completed, or after a preliminary approval from a transaction or session is completed. Any discussion herein of a real-time risk assessment and time-delayed risk assessment may apply to any stage of risk assessment, and vice versa.

One or more stages of risk assessment conducted by a variable risk engine may occur in sequence and/or in parallel. One or more event may occur after one or more stage of risk assessment. In some embodiments, the amount of risk assessment, the length of time allotted for risk assessment, the tests or processes that may run for risk assessment, at any stage (e.g., first stage, second stage, third stage, fourth stage, etc.) may depend on the transaction, session, or event.

In some embodiments, all of the stages of risk assessment may be performed by the same entity. For example, all stages of risk assessment may be performed by the institution or by a third party risk detection service. Alternatively, one or more stages of risk assessment may be performed by a first entity and one or more stages of risk assessment may be performed by a second entity. For example, a first stage may be performed by an institution and a second stage may be performed by a third party risk detection service. In other embodiments, one or more stage risk of assessment may be performed by multiple entities. For example, a first stage may be performed by both the institution and third party risk detection service. Any entities performing risk detection may utilize a server or any other device to assist with risk assessment.

In some embodiments, a real-time risk assessment may take an amount of time $T_1$. A time-delayed risk assessment may take an amount of time $T_2$. In some embodiments, $T_1$ and/or $T_2$ may be zero or greater than zero. In some embodiments, a real-time risk assessment may include zero, one, one or more tests or processes (e.g., Test A, Test B, Test C, . . . ). A time-delayed risk assessment may also include zero, one, two or more tests or processes (e.g., Test M, Test N, . . . ). In some embodiments, a test or process may take some time. For example, Test A may take an amount of time $T_A$, Test B may take an amount of time $T_B$, Test C may take an amount of time $T_C$, Test M may take an amount of time $T_M$, Test N may take an amount of time $T_N$.

A test or process may be run to assess a risk. A test or process may be algorithmic, rules-based, may involve a neural network, logistic regression and so forth. A test or process may collect and/or analyze data. A test or process may collect and/or analyze data within an amount of time, T. Different tests or processes may take the same amount of time or varying amounts of time.

In some embodiments, a test or process may be run by a risk detection module of an institution. Alternatively, a test or process may be run by a risk detection server from a risk detection service. In some embodiments, one or more test or process may be run by both the institution and risk detection server. Alternatively one or more test may be run by the institution and one or more test may be run by the risk detection service.

The tests or processes that may be run during a real-time assessment may take about $T_1$, or less than or equal to $T_1$. For instance the times for the tests or processes that may be run in sequence during a real-time assessment may be added (e.g., $T_A+T_B+T_C+\ldots$) to take about $T_1$, or less than or equal to $T_1$. In some embodiments, the tests or processes may run in parallel and/or in sequence, and may be completed within $T_1$ time. If one or more tests are run in parallel, the times for the tests or processes that may be run during a real-time assessment may take about $T_1$, or less than or equal to $T_1$. The tests or processes that may be run in sequence during a time-delayed assessment may take about $T_2$, or less than or equal to $T_2$. For instance the times for the tests or processes that may be run during a time-delayed assessment may be added (e.g., $T_M+T_N+\ldots$) to take about $T_2$, or less than or equal to $T_2$. In some embodiments, the tests or processes may run in parallel and/or in sequence, and may be completed within $T_2$ time. If one or more tests are run in parallel, the times for the tests or processes that may be run during a time-delayed assessment may take about $T_2$, or less than or equal to $T_2$.

In some embodiments, the risk engine need not be designed with time constraints initially. The decision of what constitutes "real-time" may be left to a user of the system, such as a system administrator or risk manager. The system user may be affiliated with an institution. A user of a system may set the amount of real-time analysis. In some embodiments, setting the amount of real-time analysis may include determining the maximum permitted length of time of real-time analysis (e.g., $T_1$). A system user may select any length of time for $T_1$. For example, the system user may determine that the real-time analysis should not exceed 1 second, 3 seconds, 5 seconds, 10 seconds, 15 seconds, 20 seconds, 25 seconds, 30 seconds, 35 seconds, 40 seconds, 45 seconds, 50 seconds, 1 minute, 75 seconds, 90 seconds, 2 minutes, or 3 minutes. The rest of the tests may be run during time-delayed processing, or the user may specify how long time-delayed processing may take (e.g., $T_2$). The system user need not specify an amount of time for time-delayed processing, or may determine that the real-time analysis should not exceed 1 second, 5 seconds, 10 seconds, 15 seconds, 20 seconds, 30 seconds, 45 seconds, 1 minute, 90 seconds, 2 minutes, 3 minutes, 5 minutes, 10 minutes, 30 minutes, 1 hour, 2 hours, 4 hours, or any other length of time.

In other embodiments, a user of a system may select the number or type of tests or processes that may be conducted during the real-time analysis. For example, the system user may select 3 tests to run during real-time processing. The rest of the tests may be run during time-delayed processing, or the system user may specify how many tests may be run during time-delayed processing. In some instances the system user may specify the tests that may be run during real-time processing. For example, the system user may specify Test A, Test C, and Test M to run during real-time processing. The system user may do this without regard to the amount of time the tests may take, or may base this on estimated times for the tests to take. In some embodiments, the system user may order or prioritize the tests. The rest of the tests may be run during time-delayed processing or the system user may specify which tests may be run during time-delayed processing. Thus, a continuum of risk evaluation with each progressive test may be created.

The end result is that if the sum of all the tests takes $T_1$ in aggregate—for some system owners it may still mean "real-time." In other cases, a time limit is going to be given and the risk system could cutoff the processing after the expected execution time will pass, and yet, keep processing the rest in the background. This may balance the amount of risk assessment with the time such risk assessment may take. This may allow maximizing or increasing the business yield and the risk management yield on a time curve.

A system user may predetermine the amount of real-time processing ahead of time. For example, for a particular institution, a system user may assign a particular amount or type of real-time processing and/or time-delayed processing. The system user may be associated with the particular institution. Such determinations may vary from institution to institution for a variable risk engine. In some embodiments, a system user may pre-assign the amount or type of real-time processing and/or time-delayed processing based on the network device, information from the device user, transaction type, session type, or event type. Thus, even for a particular institution, the real-time/time-delayed processing may be variable. In some instances, the user may pre-assign rules relating the amount or type of real-time processing and/or time-delayed processing which may depend on information gathered during said processing. Thus, even for particular types of transactions or sessions, the amount of processing may vary depending on individual circumstances.

In other embodiments, the risk engine may have a predetermined amount of real-time/time-delayed processing without the input of a system user. A variable risk engine may automatically determine the amount or type of real-time and/or time-delayed risk processing based on institution type, network device, information from the device user, transaction type, session type, or event type.

In some embodiments, there may be three aspects of a risk decision. First, there may be the ingredients used for the decision (e.g., raw data/facts and derived predictors). There may also be the algorithm used to ascertain risk (e.g., rules, neural nets). There may also be time to process. For example, a test or process for risk assessment may collect and/or assess data within an amount of time.

When all three factors are balanced and optimized, the end result is the best yield on the risk curve. Yet, if any of the three do not exist, are not engaged or not given ample time to process a harmonic degradation may ensue.

The ingredients level of the risk decision may be gathered and/or collected using any data collection mechanism known in the art. See, e.g., U.S. Patent Publication No. 2007/0239606 (Eisen) filed Sep. 29, 2005; U.S. Patent Publication No. 2009/0083184 (Eisen) filed Sep. 26, 2007; U.S. Patent Publication No. 2010/0004965 (Eisen) filed Jul. 1, 2009, which are hereby incorporated by reference in their entirety. Such data gathered may include data collected about the network device, about the transaction or session between the network device and the institution server, about user behavior, and/or about the user of the network device. Such data may be collected from the institution server side or may be provided by the device client side (from a client-server architecture). Such data may be collected using a browser on the network device, a script run on the network device or by the institution server, from a clock of the network device and/or institution server, from one or more databases storing device or device user information, and so forth.

For example, such data may include the IP address of the network device, a time or time zone of the network device, or personal information entered by the user such as the user's name, password, date of birth, address, credit card information, e-mail, or phone number. Such data may include one or more browser setting of the network device. Such data may include one or more cookies stored on the network device.

After the right raw data is collected and even extracted its essence, an algorithm or analysis portion may be engaged and have the right risk weight to give the desired response. The analysis may process and/or analyze the data. An algorithm may analyze data collected for the particular transaction or session, or may include data collected over multiple transactions or sessions. See, e.g., U.S. Pat. No. 7,373,669 (Eisen) issued May 13, 2008; U.S. Patent Publication No. 2005/0216278 (Eisen) filed Jul. 1, 2003; U.S. Patent Publication No. 2007/0234409 (Eisen) filed Mar. 30, 2007, which are hereby incorporated by reference in their entirety.

The element of time may be a factor in a risk assessment test or process. A sufficient amount of time to run a desired process may be required.

In some embodiments, "real-time" may denote a risk decision that is made prior to an event. In some embodiments, the event may be the end of a set period of time, a user session or transaction, an approval or denial of a transaction, any other event that may occur during a session or transaction, or any other event that may occur independent to the session or transaction. The type of event may determine how much time is allotted for this risk decision. Thus, real-time need not be a fixed amount of time for all occasions. Some examples of occasions follow.

For instance, if a shipped-goods merchant takes an order, the number of checks they wish to perform while the customer is still in the session, are the minimal set, as they do not need to take action while the user is waiting. In this case, the ingredients and processes will call for a few checks, and the heavy lifting will be done in the background, post session. This may allow for less real-time risk assessment and more time-delayed risk assessment.

In a similar example, a digital-goods merchant who is about to provide the goods, may need to run more risk decisions prior to releasing the goods. However, the amount of time for all the tests may exceed the time limit of good customer service. A limited set may be executed that exceeds the tests for shipped goods, and may not execute all available tests. This may allow for more real-time risk assessment and less time-delayed risk assessment. This is not to say that all risking stops at the moment the digital goods are delivered; rather, that the variable risk engine will continue to assess the event using all the tests, even after delivery, in order to proactively cancel/refund/deactivate the transaction, and to prevent subsequent events with similar attributes from occurring.

Additionally, if a login to a sensitive system is the event at hand, the system administrators may choose to make the process less user-friendly, yet insist on every risk decision being executed prior to granting access. This may allow for all real-time risk assessment and no time-delayed risk assessment.

Figure 3:
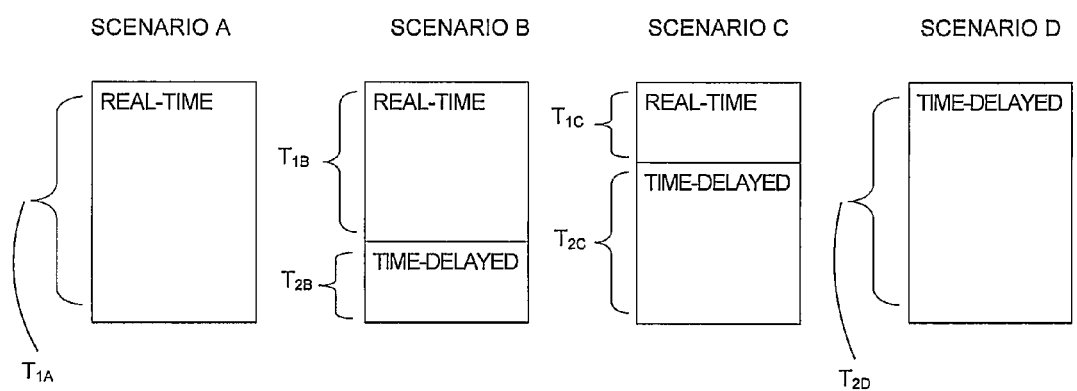
FIG. 3 shows examples of various scenarios for a variable risk engine.

FIG. 3 shows examples of various scenarios for a variable risk engine. For example, Scenario A shows a process where all available tests are run in real-time. This may take an amount of time $T_{1A}$. There may be zero time-delay processing, so any time delayed processing time would be zero. Such a scenario may be desirable in situations where the system may be sensitive, or the possibility and/or likelihood of risk may be high. Such a scenario may also be desirable in situations where a delay in login or process within the transaction or session may not be a problem. Such a scenario may also be implemented when a time-delayed risk assessment may have little or no benefit (e.g., if the event that has taken place after the real-time assessment is irrevocable). All of the available tests may be run in real-time, and/or selected tests may be run in real-time without tests being run in time-delay.

Scenario B shows a process where many available tests are run in real-time and some tests are run in time-delay. The real-time processing may take an amount of time $T_{1B}$. The time-delayed processing may take an amount of time $T_{2B}$. In some embodiments, $T_{1B}$ is greater than or equal to $T_{2B}$. Such a scenario may be desirable in situations where the system may be somewhat sensitive, or the possibility and/or likelihood of risk may be high. Such a scenario may also be desirable in situations where some delay in login or process within the transaction or session may not be a problem. Many of the available tests may be run in real-time, and/or selected tests may be run in real-time without many tests being run in time-delay.

Scenario C shows a process where some available tests are run in real-time and many tests are run in time-delay. The real-time processing may take an amount of time $T_{1C}$. The time-delayed processing may take an amount of time $T_{2C}$. In some embodiments, $T_{1C}$ less than or equal to $T_{2C}$. Such a scenario may be desirable in situations where the system may not be too sensitive, or the possibility and/or likelihood of risk may be lower. Such a scenario may also be desirable in situations where too much delay in login or process within the transaction or session may be a problem. For example, in consumer transactions, a consumer may not want to wait for a very long time to be approved. Some of the available tests may be run in real-time, and/or selected tests may be run in real-time while many tests may be run in time-delay.

Scenario D shows a process where no tests are run in real-time and all tests are run in time-delay. The real-time processing may take zero amount of time. The time-delayed processing may take an amount of time $T_{2D}$. Such a scenario may be desirable in situations where the system is not sensitive, or the possibility and/or likelihood of risk is very low. Such a scenario may also be desirable in situations where any delay in login or process within the transaction or session may be a problem. All of the available tests may be run in time-delay, and/or selected tests may be run in time-delay, without waiting for any tests to be run in real-time.

Any spectrum of real-time to time-delayed risk assessment may be provided. For example, about 100%, 95%, 90%, 85%, 80%, 75%, 70%, 65%, 60%, 55%, 50%, 45%, 40%, 35%, 30%, 25%, 20%, 15%, 10%, 5% or 0% of the risk assessment may occur in real-time while the rest may occur in time-delay. In some embodiments, about X % of the risk assessment may occur in real-time while the rest may occur in time-delay, wherein X is any real number between zero and 100.

In some examples a user can select between different risk assessment levels. For example, a user can select between Scenario A, B, C, and D, or any number of different risk assessment levels.

A continuous variable risk engine, may enable a system user to decide on which event types, which rules fire, and in what amount of time. A user of a system may determine the amount risk assessment that may occur in real-time. The user may determine this based on length of time, processes to occur, or any other event. This may place the notion of "real-time" or "time-delayed" into a continuum, where the event, data or other factor determines the execution.

A benefit is that the same engine can provide some or all the tests based on time and ingredients available. A risk engine may have access to one or more tests. Based on the situation, the risk engine may perform one or more of the tests available. The decision to run one or more tests may be flexible from situation to situation. The decision to run one or more tests may be predetermined for particular scenarios. A system user may be able to alter the tests for particular scenarios over time, or in a case-by-case basis. The determination of which tests and/or order of tests to run may be predefined by a user, or may be preset in any other manner. So in cases the raw ingredient is missing, there is no need to go through a process and waste precious milliseconds.

In some instances, only the data that should be present, should be processed. For example, if it is a Web event, the engine may test the IP Address, and if it is missing, that may become a signal. Alternatively, on a phone order, there may be no need to process the login on IP Address resolution nor fire rules—as the results will never yield anything. Thus, the tests run or analysis conducted may depend on gathered data.

Figure 4A:
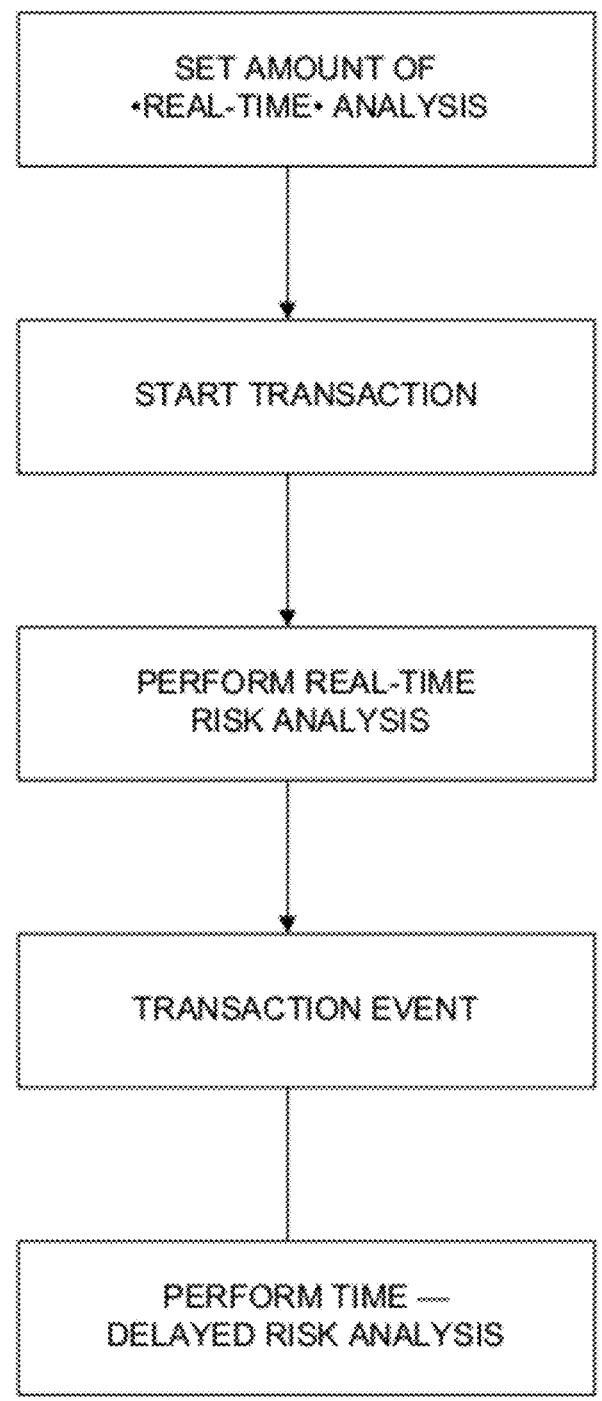
FIG. 4A shows a risk assessment process in accordance with an embodiment of the invention.

FIG. 4A shows a risk assessment process in accordance with an embodiment of the invention. A method of risk assessment may include the steps of setting an amount of real-time risk analysis for an online transaction, performing the amount of real-time risk analysis based on the set amount; and performing an amount of time-delayed risk analysis. In some embodiments, the process may include setting the amount of real-time analysis, starting a transaction or session, performing real-time risk analysis, having an event, and performing time-delayed risk analysis.

The amount of real-time risk analysis may be preset by a user. For example, a user may define an amount of time to allow for real-time risk analysis. For example, a user may preset that the real-time risk analysis is not to exceed 15 seconds, or any other amount of time, T. In some embodiments, the tests or processes may be preselected or prioritized so that certain tests are run first. The tests may be run in sequence and/or in parallel. After the predetermined amount of time, an event may occur. The tests that completed in real-time before the predetermined amount of time may be used in the event, while the rest of the tests may occur in the background in time-delayed risk assessment. The test results from real-time may be used in the event, such as whether to approve or decline a login, transaction, or to perform any other action relating to a transaction or session.

As previously mentioned, the amount of time for real-time risk analysis or type of real-time risk assessment may depend on the event type or transaction or session type. For example, certain types of transactions or sessions may require more or less real-time risk analysis prior to the event. Furthermore, depending on the type of event or transaction/session different tests and/or processes may be desired, or the priorities of the tests and/or processes may be changed. Thus, depending on the event type or transaction/session type, the tests to be performed during the real-time risk analysis or the order of the tests to be performed during the real-time risk analysis may be changed.

In some embodiments, the tests or the order of tests may be predetermined. In some instances, the predetermination may be provided by a system user. Alternatively, a user may make a selection of an event or transaction/session type and the risk detection system may suggest the tests or order of tests. In some instances, the predetermination may be provided by the system without user input. Any discussion herein of user specifications may also apply to predetermined rules that may be determined by the system without user input or indirect user input. In some instances, the tests or order of tests may be predetermined based on the event and/or transaction/session type. In some embodiments, the tests or order of tests may depend on results from previous tests.

In some embodiments, a system user may indirectly specify the tests or order of tests, or the amount of time allotted. For example, the user may specify a desired security level. Based on the security level, the amount of time for real-time assessment may be determined. For example, if a user selects a high security level, the amount of real-time risk assessment may be increased. Also, based on the security level, the tests or priorities of tests may be determined. Alternatively, the user may specify the security level and the amount of time for real-time assessment separately.

In some embodiments, it may be predetermined how many tests or the order of tests that may be performed within the amount of time designated for real-time analysis, and the rest of the tests may occur during time-delayed analysis. In some embodiments, depending on processor speed or other factors, different numbers of tests may be completed within a particular time. Thus, in some embodiments, for different transactions, different numbers of tests may be completed during real-time risk assessment.

For example, if a user specifies that a real-time assessment may be completed within 15 seconds, and during a first transaction, Test 1 takes 5 seconds, Test 2 takes 8 seconds, and Test 3 takes 2 seconds, Test 1, Test 2, and Test 3 may be performed during real-time risk assessment. However, during a second transaction, if the network or processors are slower, Test 1 may take 6 seconds, Test 2 may take 9 seconds, and Test 3 may take 3 seconds. Only Tests 1 and 2 may be completed during the real-time risk assessment and Test 3 may occur during the time-delayed risk assessment.

In another scenario, a user may specify that a real-time assessment may be completed within 30 seconds, (e.g., for a scenario where time delay may be less of a problem or the security risk is greater). If Test 1 takes 5 seconds, Test 2 takes 8 seconds, Test 3 takes 2 seconds, Test 4 takes 5 seconds, and Test 5 takes 8 seconds, then Test 1, Test 2, Test 3, Test 4 and Test 5 may be performed during real-time risk assessment. Increasing the amount of real-time assessment time may allow more tests to be performed.

In another example, a user may specify that a real-time assessment may be completed within 15 seconds, while tests may be performed in parallel. For example, during a first transaction, Test 1 takes 5 seconds, Test 2 takes 14 seconds, and Test 3 takes 2 seconds, Test 1, Test 2, and Test 3 may be performed during real-time risk assessment. However, during a second transaction, if the network or processors are slower, Test 1 may take 8 seconds, Test 2 may take 16 seconds, and Test 3 may take 3 seconds. Only Tests 1 and 3 may be completed during the real-time risk assessment and Test 2 may occur during the time-delayed risk assessment.

In another example, a user may specify that three tests, Tests 1, 2, and 3 may be completed in real-time risk assessment before an event may take place. Even if Tests 1, 2, and 3 do not take the same amount of time for a first transaction and second transaction, all three tests may be run during the real-time risk assessment. The system user may specify tests to be completed in real-time processing without limiting a length of time.

In some implementations, a user may specify a set of rules based on the tests and timing of the tests. A user may specify that one or more tests are to be run in real-time regardless of length of time, while in other cases may specify that length of time takes priority over optional tests. For example, a user may prioritize Test 1 to run during real-time risk assessment no matter how long Test 1 takes. However, for some other tests, Test 2 and Test 3 the user may prioritize to them to run during real-time risk assessment as long as they are completed before 20 seconds have elapsed from the start of the assessment. If Test 2 or Test 3 exceeds the amount of time allotted, they may continue running in background in time-delayed risk assessment. In some instances, some tests may be mandatory (prioritize running the test over the length of time for real-time assessment) while other tests may be optional (prioritize the length of time for real-time assessment over running the particular tests). In some embodiments, multiple time benchmarks may be provided, and priorities for one or more tests before or after the priorities for the time benchmarks. For example, if a particular test is not completed by a particular time benchmark, it may occur during time-delayed assessment and the real-time assessment may skip to another test that must be completed by a subsequent time benchmark.

In some embodiments, a user may define the event and/or transaction/session type. For example, a user may designate that a transaction between a network device and an institution server is a type of online transaction. Alternatively, the user may provide options for different event/transaction/session types that may be detected. For example, the user may specify which tests and/or the order of tests for each event/transaction/session types that may be detected.

In some embodiments, a user may define one or more processes to run during real-time risk analysis. For example, a user may preset which tests are to be completed during real-time risk analysis and/or the order of the tests to be performed during the real-time risk assessment. In some embodiments, the tests or processes may be preselected or prioritized so that certain tests are run first. The tests may be run in sequence and/or in parallel. After the predetermined tests are completed, an event may occur. The tests that completed in real-time before the predetermined amount of time may be used in the event, while other tests may occur in the background in time-delayed risk assessment. The test results from real-time may be used in the event, such as whether to approve or decline a login, transaction, or to perform any other action relating to a transaction or session.

A transaction event may occur subsequent to the completion of a real-time risk assessment. The transaction event may be predetermined by a user. For example, the transaction may be the passage of a predetermined period of time, reaching a particular time of day, the completion of predetermined processes, or any other event relating to the transaction or session. Alternatively, a transaction event may occur based on the real-time risk assessment. For example a transaction may be approved or declined based on the real-time risk assessment. In another example, a user may be authenticated and allowed to access a system based on the real-time risk assessment.

Following the transaction event, time-delayed risk analysis can be performed. In some embodiments, the time-delayed risk analysis may start after the transaction event has occurred. In other embodiments, the time-delayed risk analysis may have already started prior to the event, but may continue after the transaction event has occurred.

In some embodiments, the time-delayed risk assessment may be used for another event or to validate the earlier event. For example, the real-time risk assessment may be used to preliminarily approve a transaction for an online business. However, before an item or service is provided, the time-delayed risk assessment may be completed and used to determine whether to deliver the item or service. In some embodiments, the time-delayed risk assessment may be used to flag a network device and/or device user for future transactions.

Figure 4B:
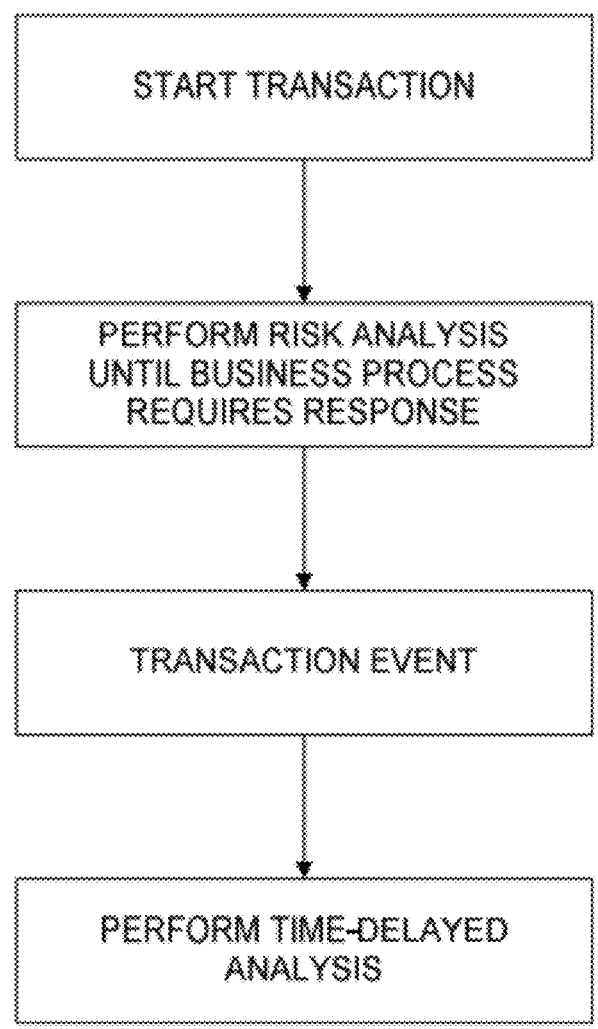
FIG. 4B shows an additional example of a risk assessment process.

FIG. 4B shows an additional example of a risk assessment process. A method of risk assessment may include the steps starting a transaction, performing an amount of real-time risk analysis until a business process requires a response, a transaction event, and performing an amount of time-delayed risk analysis. In some embodiments, a transaction event may occur when a business process requires a response.

Figure 5:
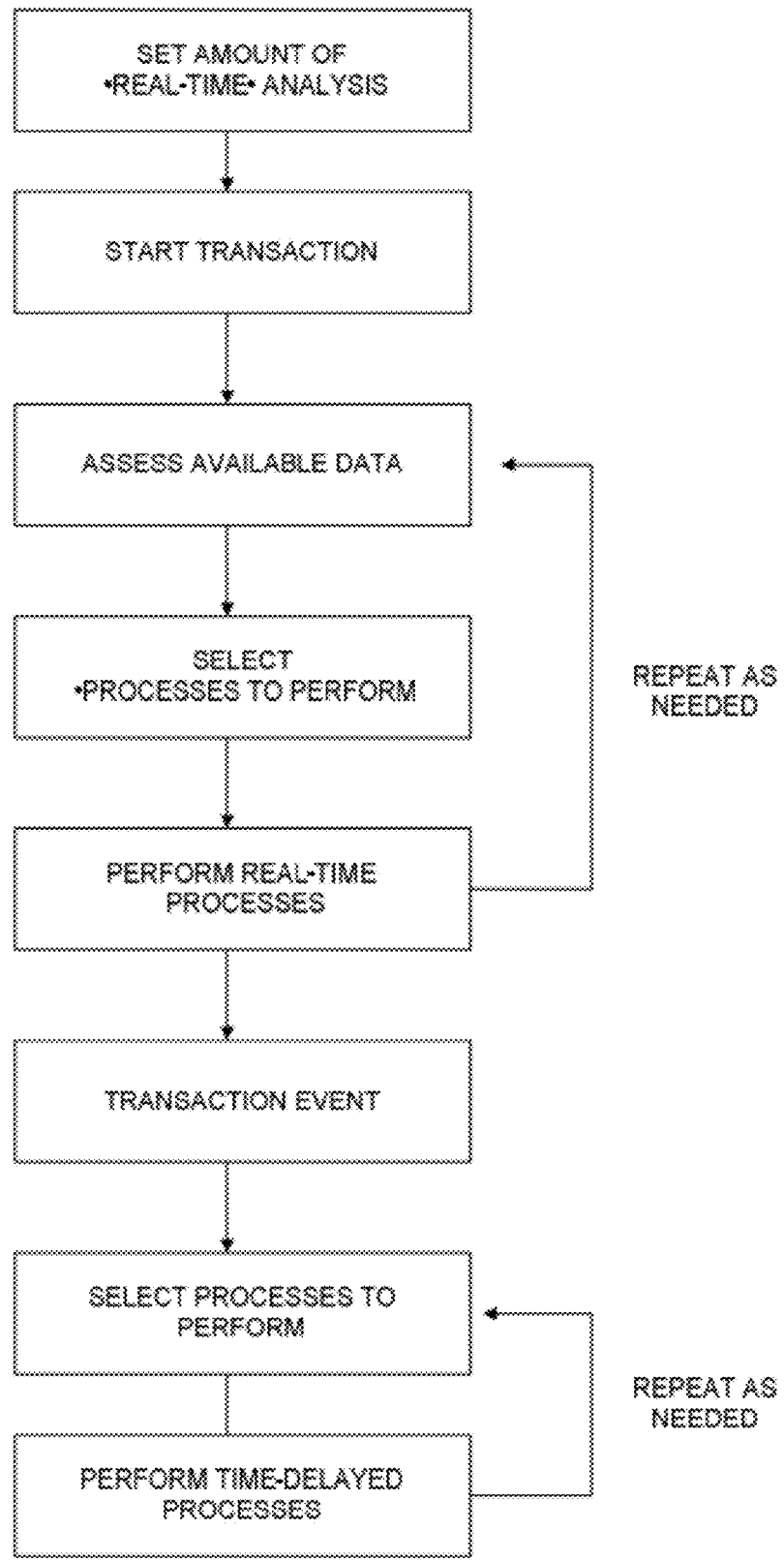
FIG. 5 shows a risk assessment process in accordance with another embodiment of the invention.

FIG. 5 shows a risk assessment process in accordance with another embodiment of the invention. A method of risk assessment may include one or more of the following steps: setting an amount of real-time analysis, starting a transaction or session, assessing available data, selecting one or more processes to perform, performing the real-time process, having an event, selecting one or more time-delayed process to perform, or performing the time-delayed process.

As previously discussed the amount of real-time analysis may be preset by a user or system. The amount of real-time analysis may include one or more rules relating to the tests to be run in real-time and/or the amount of time for the tests or processes to be run in real-time. A user or system may also optionally predetermine the amount of time-delayed analysis. This may include one or more rules relating to the tests to be run in time-delay and/or the amount of time for tests to be performed in time-delay or any other stage.

A transaction or session may occur while a network device is communicating with an institution. In some embodiments, the institution may collect data relating to the network device, user of the network device, transaction, and/or session. In some embodiments, the institution may assess the collected data and select processes to perform in real-time. In some embodiments, the institution may select which processes to perform according to predetermined rules or algorithms. For example, if the institution detects that the network device is of a particular type, this may affect the processes that are run. Different tests or priorities of tests may be preferable if a network device is a computer versus a smartphone.

In some embodiments, the data collected may include some preliminary collected data. Additional data may be collected as one or more processes are run. One or more of the processes may collect data and/or analyze the data. In some embodiments, later processes may be selected or run based on a set of predetermined rules or algorithms and data collected from earlier processes. For example, if Process 1 is a process run at the beginning of a real-time risk assessment, and collects some form of the data, the data may inform that Process 2 is unnecessary or irrelevant and the risk assessment can skip directly to Process 3. This may save time and resources during risk assessment. This may reduce the time of the real-time risk assessment, or may permit more processes to be run during time allotted for real-time risk assessment.

In some embodiments, all data may be collected initially, and analyzed be one or more process during real-time risk assessment. The initial data collected may or may not affect process selection for real-time risk assessment. Alternatively, an iterative process may be provided, where a process may collect data, and depending on the data collected, additional processes may be provided which may or may not collect additional data. These steps may be repeated one or more times. These steps may be repeated until the real-time risk assessment time runs out, the predetermined processes have been completed, or any other predetermined event has occurred.

A transaction event may occur subsequent to the completion of a real-time risk assessment. The transaction event may be predetermined by a user. For example, the transaction may be the passage of a predetermined period of time, reaching a particular time of day, the completion of predetermined processes, or any other event relating to the transaction or session. Alternatively, a transaction event may occur based on the real-time risk assessment. For example a transaction may be approved or declined based on the real-time risk assessment. In another example, a device user may be authenticated and allowed to access a system based on the real-time risk assessment.

Following the transaction event, time-delayed risk analysis can be performed. In some embodiments, the time-delayed risk analysis may start after the transaction event has occurred. Time-delayed risk analysis may occur immediately after the transaction event, or after a delay following the transaction event. In other embodiments, the time-delayed risk analysis may have already started prior to the event, but may continue after the transaction event has occurred.

In some embodiments, the processes for the time-delayed risk analysis may be predetermined and preset. The amount of time-delayed risk analysis may optionally be set. This may optionally be set by a user or a system. In some embodiments, the processes for the time-delayed risk analysis may depend on data collected earlier on, such as during the real-time risk analysis. Such data may include data that was preliminarily collected, or collected by one or more process. In some embodiments, processes for time-delayed risk analysis may be selected based on real-time risk analysis data. In other embodiments, processes for time-delayed risk analysis may be selected based on data collected from earlier processes during time-delayed risk analysis. Processes for time-delayed risk analysis may include one or more processes that were not completed during real-time analysis.

In some examples, time-delayed assessment may allow for data to be collected all upfront with following processes for analysis only. In other examples, processes may be iterative, and may optionally collect data that may affect later processes. For instance, one or more processes to perform may be selected. The one or more time-delayed process may be performed. These steps may be repeated as often as desired or necessary. These steps may be repeated until all time-delayed processes have been completed. In some embodiments, one or more processes may be selected based on the results of earlier processes that may have occurred during the time-delayed process, or real-time process.

A variable risk engine may have flexibility to accommodate different event or transaction types. In some embodiments, the same risk engine may be used for different situations, with varying parameters. The same risk engine may have access to the same available processes. However, the selection of which processes are used and the timing of the processes may vary for different situations. Alternatively, they may remain the same for multiple situations. A variable risk engine may advantageously accommodate different timing and security needs for different transaction situations.

Figure 6:
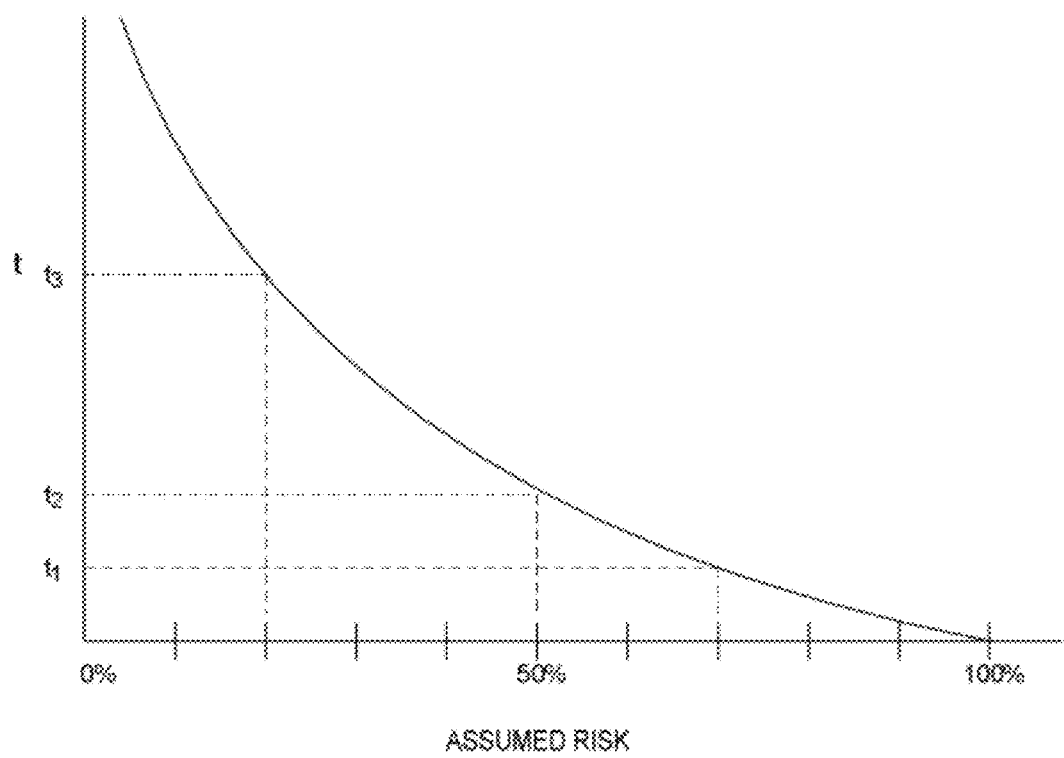
FIG. 6 shows a relationship between the amount of time spent on risk assessment and the risk assumed.

FIG. 6 shows a relationship between the amount of time spent on risk assessment and the risk assumed. In some embodiments, an inverse relationship may be provided between the amount of time spent for risk assessment and the amount of risk assumed. Increasing the time t spent in risk assessment may decrease the amount of risk assumed, and decreasing the time t spent in risk assessment may increase the amount of risk assumed. For example, spending about $t_1$ time in risk assessment may result in an assumed risk of about 70%, while spending about $t_2$ time in risk assessment may result in an assumed risk of about 50%, and spending about $t_3$ time in risk assessment may result in an assumed risk of about 20%, where $t_1 < t_2 < t_3$.

In some embodiments, there may be ranges of risk assumed. For example, a large amount of risk may be assumed, a moderate amount of risk may be assumed, or a low amount of risk may be assumed. The amount of risk assumed may correspond to percentages of risk assumed. For example, a large amount of risk may be about 70%-100% assumed risk, a moderate amount of risk assumed may be about 30%-70% assumed risk, and a low amount of risk assumed may be less than 30% assumed risk. In some embodiments, a large amount of risk assumed may correspond to a small amount of time for risk assessment, a moderate amount of risk assumed may correspond to a moderate amount of time for risk assessment, and a low amount of risk assumed may correspond to a large amount of time for risk assessment.

In some embodiments, the amount of risk assessment may be selected anywhere along the continuum. In some embodiments, an amount of time for risk assessment may be selected. Based on the amount of time for risk assessment selected, an amount of risk may be assumed. In some instances, an acceptable level of assumed risk may be determined, and a corresponding amount of time for risk assessment may be selected. A variable risk engine may provide options for varying degrees of risk assessment, resulting in varying degrees of risk assumption.

The systems and methods may accommodate varying authentication levels known in the art. See, e.g., U.S. Patent Publication No. 2005/0097320 (Golan et al.) filed Sep. 13, 2004; U.S. Pat. No. 6,295,605 (Dockter et al.) filed Sep. 10, 1998; U.S. Patent Publication No. 2007/0101405 (Engle et al.) filed Jul. 30, 2004; U.S. Pat. No. 7,457,823 (Shraim et al.) filed Nov. 23, 2004; U.S. Patent Publication No. 2008/0021801 (Song et al.) filed Oct. 18, 2005, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computerized method for variable risk assessment comprising:
   accessing a set of rules for performing a real-time risk analysis on an online transaction in process;
   accessing electronic information associated with the online transaction;
   identifying one or more characteristics of the online transaction based at least in part on the electronic information;
   determining, using a computer processor, a time limit for the real-time risk analysis based at least in part on the set of rules or the one or more characteristics of the online transaction;
   selecting a first set of tests for the real-time risk analysis based at least in part on the one or more characteristics of the online transaction to aid in assessing a risk of fraud for the online transaction, wherein the first set of tests is associated with an expected execution time that may be longer than the time limit;
   selecting a second set of tests for the time-delayed risk analysis for the online transaction, the second set of tests to be completed after termination of the online transaction and to aid in assessing the risk of fraud for the online transaction;
   performing, using the computer processor, the first set of tests for the real-time risk analysis while the online transaction is in process until the time limit is met;
   performing, using the computer processor, the second set of tests for the time-delayed risk analysis, wherein the time-delayed risk analysis is completed after the termination of the online transaction, and wherein performing the second set of tests comprises performing any remaining testing of the first set of tests if performing the first set of tests resulted in an execution time longer than the time limit; and assessing overall risk of fraud for the online transaction based on the first set of tests for the real-time risk analysis and the second set of tests for the time-delayed risk analysis.

2. The computerized method of claim 1 further comprising determining, during the online transaction and after the time limit, a level of risk associated with the online transaction based at least in part on the real-time risk analysis, and prior to completing the time-delayed risk analysis.

3. The computerized method of claim 1 wherein the set of rules for performing the real-time risk analysis is preset by a user, or automatically determined by a business process.

4. The computerized method of claim 1 wherein the one or more characteristics of the online transaction comprise at least one of the following: an amount of time of the online transaction, a type of the online transaction, a type of an online session, or a type of a user.

5. The computerized method of claim 1 wherein the time limit for the real-time risk analysis is greater than zero.

6. The computerized method of claim 1 wherein the electronic information associated with the online transaction comprises network device information from a network device involved in the online transaction.

7. The computerized method of claim 1 further comprising: determining whether to approve the online transaction after performing the real-time risk analysis and prior to performing the time-delayed risk analysis.

8. A system for variable risk assessment comprising:
an institution server; and
a network device in communication with the institution server,
wherein the institution server is configured to perform, with aid of a computer processor, a risk analysis of the communication with the network device, and
wherein the institution server:
accesses a set of rules for performing a real-time risk analysis on an online transaction in process;
accesses electronic information associated with the online transaction;
identifies one or more characteristics of the online transaction based at least in part on the electronic information;
determines, using the computer processor, a time limit for the real-time risk analysis based at least in part on the set of rules or the one or more characteristics of the online transaction;
selects a first set of tests for the real-time risk analysis based at least in part on the one or more characteristics of the online transaction with the network device to aid in assessing a risk of fraud for the online transaction, wherein the first set of tests is associated with an expected execution time that may be longer than the time limit;
selects a second set of tests for the time-delayed risk analysis for the online transaction, the second set of tests to be completed after termination of the online transaction and to aid in assessing the risk of fraud for the online transaction;
performs the first set of tests for the real-time risk analysis while the online transaction is in process until the time limit is met;
performs the second set of tests for the time-delayed risk analysis wherein the time-delayed risk analysis is completed after the termination of the online transaction, and wherein performing the second set of tests comprises performing any remaining testing of the first set of tests if performing the first set of tests resulted in an execution time longer than the time limit; and
assesses overall risk of fraud for the online transaction based on the first set of tests for the real-time risk analysis and the second set of tests for the time-delayed risk analysis.

9. The system of claim 8, wherein the set of rules for performing the real-time risk analysis is provided by a user.

10. The system of claim 8, wherein the set of rules for performing real-time risk analysis is electronically provided by another network device.

11. The system of claim 8, wherein the one or more characteristics of the online transaction comprise at least one of the following: an amount of time of the online transaction, a type of the online transaction, a type of an online session, or a type of a user.

12. The system of claim 8 wherein the electronic information associated with online transaction comprises network device information from a network device involved in the online transaction.

13. The system of claim 12, wherein the network device information comprises an IP address of the network device.

14. The system of claim 8, wherein the institution server further determines, during the online transaction and after the time limit, a level of risk associated with the online transaction based at least in part on the real-time risk analysis, and prior to completing the time-delayed risk analysis.

15. The system of claim 8, wherein the institution server further determines whether to approve the online transaction after performing the real-time risk analysis and prior to performing the time-delayed risk analysis.

16. A non-transitory computer readable medium for variable risk assessment having computer-executable instructions stored thereon, the computer-executable instructions readable by a computing system comprising one or more computing devices, wherein the computer-executable instructions are executable on the computing system in order to cause the computing system to perform operations, comprising:
accessing a set of rules for performing a real-time risk analysis on an online transaction in process;
accessing electronic information associated with the online transaction;
identifying one or more characteristics of the online transaction based at least in part on the electronic information;
determining, using a computer processor, a time limit for the real-time risk analysis based at least in part on the set of rules or the one or more characteristics of the online transaction;
selecting a first set of tests for the real-time risk analysis based at least in part on the one or more characteristics of the online transaction to aid in assessing a risk of fraud for the online transaction, wherein the first set of tests is associated with an expected execution time that may be longer than the time limit;
selecting a second set of tests for the time-delayed risk analysis for the online transaction, the second set of tests to be completed after termination of the online transaction to aid in assessing the risk of fraud for the online transaction;
performing the first set of tests for the real-time risk analysis while the online transaction is in process until the time limit is met;

performing the second set of tests for the time-delayed risk analysis, wherein the time-delayed risk analysis is completed after the termination of the online transaction, and wherein performing the second set of tests comprises performing any remaining testing of the first set of tests if performing the first set of tests resulted in an execution time longer than the time limit; and assessing overall risk of fraud for the online transaction based on the first set of tests for the real-time risk analysis and the second set of tests for the time-delayed risk analysis.

17. The non-transitory computer readable medium of claim 16 wherein the computer-executable instructions are executable on the computing system in order to cause the computing system to perform further operations, comprising: determining whether to approve the online transaction after performing the real-time risk analysis and prior to performing the time-delayed risk analysis.

18. The non-transitory computer readable medium of claim 16 wherein the one or more characteristics of the online transaction comprise at least one of the following: an amount of time of the online transaction, a type of online transaction, a type of an online session, or a type of a user.

19. The non-transitory computer readable medium of claim 17 wherein the computer-executable instructions are executable on the computing system in order to cause the computing system to perform further operations, comprising: determining, during the online transaction and after the time limit, a level of risk associated with the online transaction based at least in part on the real-time risk analysis, and prior to completing the time-delayed risk analysis.

20. The non-transitory computer readable medium of claim 16 wherein the electronic information associated with the online transaction comprises network device information from a network device involved in the online transaction.

\* \* \* \* \*